UNITED STATES PATENT OFFICE.

ISAAC S. STAHL, OF BALLY, PENNSYLVANIA, ASSIGNOR OF ONE-HALF TO GEORGE W. MELCHER, OF BALLY, PENNSYLVANIA.

COMPOSITION FOR ARTIFICIAL WOOD.

1,086,235.　　　　Specification of Letters Patent.　　Patented Feb. 3, 1914.

No Drawing.　　Application filed September 13, 1912.　Serial No. 720,142.

*To all whom it may concern:*

Be it known that I, ISAAC S. STAHL, a citizen of the United States, residing at Bally, in the county of Berks and State of Pennsylvania, have invented certain new and useful Improvements in Compositions for Artificial Wood, of which the following is a specification.

My invention relates to artificial wood and more particularly to compositions for making articles having the appearance of natural wood, and has for its object the production of an inexpensive composition which may be easily made into moldings and other ornaments, and which will be flexible, smooth and non-shrinkable, and durable, and that will receive driven nails the same as natural wood, and resemble ebony in color, polish, and finish, and which may be made to imitate other woods by painting, graining, varnishing, etc.

I am aware that there are other compositions for making artificial wood but they are unsatisfactory and objectionable for the reason that they shrink and become hard like stone which deprives them of three important characteristics of my composition—smoothness, flexibility, and the reception of driven nails. Articles made of my composition remain pliable and receive driven nails for an indefinite or any length of time, while the compositions for artificial wood heretofore made become hard, stone like, and will not permit of the driving of nails into them.

Another superiority of my composition over any other of which I am aware is that it will not shrink and has a highly smooth surface which does not crack when the article is bent and which will take varnish which also will not crack or spring from the surface.

My composition consists of glue, water, rosin, molasses, crude petroleum, asphaltum, and plaster of Paris.

In the preparation of my composition I employ a bath-boiling or water-jacketed vessel in which I put approximately twelve pounds of glue and five quarts of water, and when the glue is thoroughly dissolved I add approximately twelve pounds of powdered rosin, stirring the compound frequently until the rosin is dissolved. I then add molasses, five quarts more or less according to the flexibility desired. I then boil and stir the compound until the molasses has become thoroughly mixed with the other ingredients. I then mix in a separate vessel three quarts of crude petroleum and approximately fourteen pounds of asphaltum at a temperature below the boiling point but sufficiently high to melt the asphaltum and cause it to become thoroughly mixed with the petroleum. I then permit this preparation to cool off or drop to a temperature of about 175° Fah. and then add it to the first compound. The first compound must be kept at a boiling point while adding the combination of petroleum and asphaltum and then the whole kept at a boiling point for at least one-half hour. Frequent agitation or stirring is necessary until the two preparations have become thoroughly mixed. When the compound has boiled a sufficient length of time, say one-half hour, I add fifteen pounds of plaster of Paris, or so much more or less of plaster of Paris as may be found necessary to bring the composition to the desired consistency. When this is done the composition is complete and ready to be molded into any desired form by any well known means, the composition being kept warm until molded.

Glue, rosin, and asphaltum vary somewhat in bulk, and the exact quantity of each to be used can not be positively stated, but the quantities given are approximately correct. For instance if gum-asphaltum is used the quantity stated is practically exact and a slight test will determine the exact quantity proper if a lower grade of asphaltum is used, and so too with the glue and rosin.

The composition will not stick to the mold, is easily handled, and can be taken from the mold at once.

Ornaments made of this composition are inexpensive, durable, and flexible with a smooth hard surface which will not crack if bent or twisted, and which will take varnish which will not crack if the ornament is bent.

It will be noted that the texture and surface finish of articles made of my composition permit of their being made to resemble metal instead of wood by painting or coating their surface with any bronze or paint that will give a metallic effect.

Having thus described my invention what I claim is:

1. A composition for making plastic artificial wood consisting of approximately twelve pounds of glue dissolved in approximately five quarts of water, approximately twelve pounds of rosin, approximately five quarts of molasses according to the flexibility desired, approximately three quarts of crude petroleum, and approximately fourteen pounds of asphaltum, and sufficient plaster of Paris to bring the composition to a plastic consistency that will permit of molding it into any desired shape.

2. A composition consisting of twelve pounds of glue, five quarts of water, approximately twelve pounds of powdered rosin, approximately five quarts of molasses, three quarts of crude petroleum, approximately fourteen pounds of asphaltum, and approximately fifteen pounds of plaster of Paris, substantially as and for the purpose described.

3. A compound for making a plastic imitation of wood comprising twelve pounds of glue, five quarts of water, twelve pounds of powdered rosin, five quarts of molasses, three quarts of crude petroleum, fourteen pounds of asphaltum, and fifteen pounds of plaster of Paris.

4. A compound for making a plastic imitation of wood comprising twelve pounds of glue, five quarts of water, twelve pounds of rosin, five quarts of molasses, three quarts of crude petroleum, 14 pounds of asphaltum, and sufficient plaster of Paris to give the composition the degree of plasticity necessary to molding it into the shape desired.

In testimony whereof I hereto affix my signature in the presence of two witnesses.

ISAAC S. STAHL.

Witnesses:
JAMES REICHART,
GEO. W. MELCHER.